July 3, 1923.

H. F. OPPERMAN 1,460,559

PINEAPPLE SHELL FEEDING DEVICE

Filed May 31, 1922

Inventor
HUGH F. OPPERMAN.
By Dewey, Strong, Townsend & Loftus
Attys

July 3, 1923.

H. F. OPPERMAN 1,460,559

PINEAPPLE SHELL FEEDING DEVICE

Filed May 31, 1922 3 Sheets-Sheet 2

Inventor
HUGH F. OPPERMAN
By Dewey, Strong, Townsend & Loftus
Attys

July 3, 1923.

H. F. OPPERMAN 1,460,559

PINEAPPLE SHELL FEEDING DEVICE

Filed May 31, 1922

Inventor
HUGH F. OPPERMAN.
By Dewey, Strong, Townsend & Loftus
Attys

Patented July 3, 1923.

1,460,559

UNITED STATES PATENT OFFICE.

HUGH F. OPPERMAN, OF HONOLULU, TERRITORY OF HAWAII, ASSIGNOR TO CALIFORNIA PACKING CORPORATION, OF SAN FRANCISCO, CALIFORNIA, A CORPORATION OF NEW YORK.

PINEAPPLE-SHELL-FEEDING DEVICE.

Application filed May 31, 1922. Serial No. 564,683.

*To all whom it may concern:*

Be it known that I, HUGH F. OPPERMAN, a citizen of the United Kingdom of Great Britain, residing at Honolulu, Territory of Hawaii, have invented new and useful Improvements in Pineapple-Shell-Feeding Devices, of which the following is a specification.

This invention relates to a device for automatically removing the shells from any pineapple sizing machine and transferring them meat side uppermost to a machine commonly known as a pineapple meat eradicator.

It is common practice in pineapple factories where the meat from the inside of the pineapple shell is employed to allow the shell to fall from the sizing machine into a chute, which in turn delivers the shell to an endless conveyor which conveys the shell to men or operators who feed them by hand into the meat eradicator. By allowing the shells to fall promiscuously first into the chute and then onto a conveyor, pieces of broken shell and dirt come in contact with the meat of the shells, thus requiring considerable hand labor to remove the dirt and other foreign matter before processing. It is also common practice to feed the shells from the conveyor into the eradicator by hand. This requires considerable manual labor and as the operators often feed the shells in a careless manner, an undesirable product is obtained and considerable loss of fruit is encountered. It is the object of the present invention to provide mechanical feed means whereby the shells are automatically transferred meat side uppermost from the sizing machine directly into the eradicator, thereby effecting a considerable saving in labor and at the same time obtaining a greater yield and a more satisfactory and cleaner product. Further objects will hereinafter appear.

The invention consists of the parts and the construction, combination and arrangement of parts as hereinafter more fully described and claimed, having reference to the accompanying drawings, in which—

Figure 1:
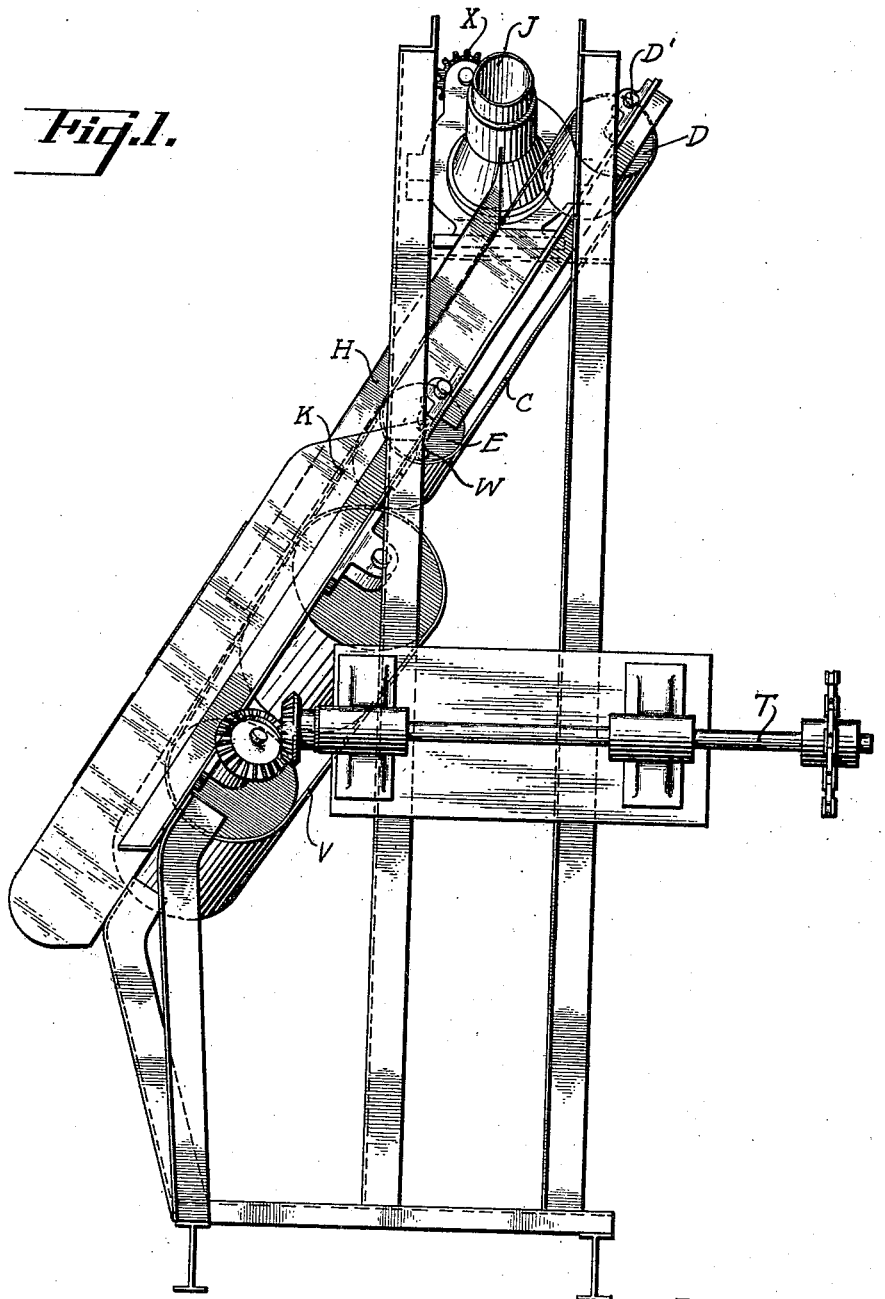
Fig. 1 is a side elevation of the feeding device forming the subject matter of the present invention showing its position with relation to the sizing head and the meat eradicator.
Figure 2:
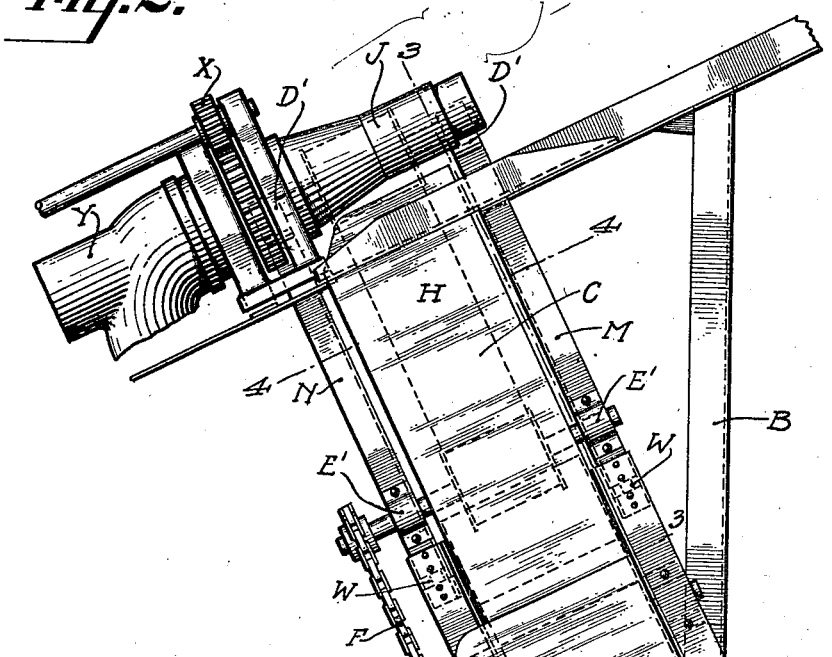
Fig. 2 is a front elevation.
Figure 3:
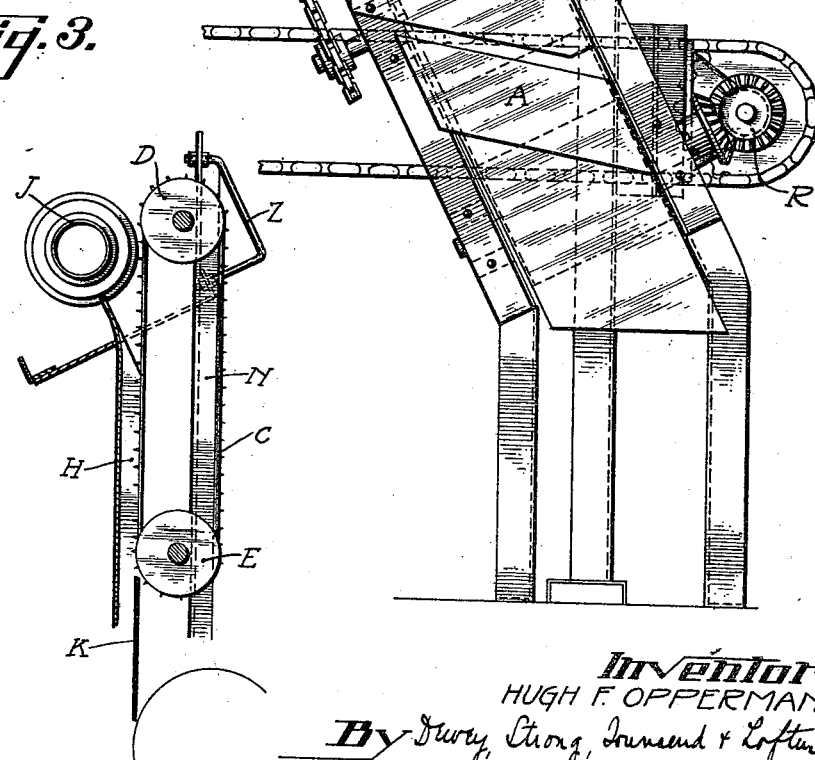
Fig. 3 is a section on line 3—3, Fig. 2.
Figure 4:
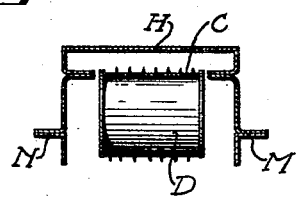
Fig. 4 is a section on line 4—4, Fig. 2.

Referring to the drawings in detail, and particularly to Figs. 1, 2 and 3, J indicates the cutting head of a sizing machine, and A the eradicator. The eradicator proper is supported on a frame B of suitable construction and the feed belt employed in connection therewith and indicated at V is driven by a drive shaft T and gears R. Disposed between the sizing machine and the eradicator is a conveyor belt C, which is supported by a pair of pulleys D and E, said pulleys being journalled in bearings D'. and E', which in turn are carried by an extension angle iron frame consisting of side sections M and N, which are hingedly secured to the upper end of the eradicator as at W. The hinge support provides a simple attachment which permits the device to be attached to any eradicator and furthermore permits adjustment to and away from the sizing head J, thus rendering the device adjustable to accommodate shells of varying thickness as they discharge from the rotating sizing head.

Adjustment of the belt C with relation to the sizing head is obtained by a bracket member Z, which swings the upper end of the frame members M and N to and away from the sizing head as indicated in Fig. 3.

The top or working side of the belt C is covered with a three sided metal chute H, which extends from the underside of the sizing head J to the upper end of the eradicator A. The sizing head is provided with a stationary slitting knife U and the chute H is partly attached to the shell splitting knife. The top end of the chute is slightly curved where it meets the revolving sizing head J as shown in Fig. 3, and in this manner serves as a guide to direct the shells, meat side uppermost, through the chute to the meat eradicator.

The lower end of the belt C ends at a point adjacent the conveyor belt V and a bridging plate K is disposed between the two conveyors to direct the shells from one conveyor to another. Power to drive the conveyor C may be obtained in any suitable manner, or it may be driven as here indicated by a chain drive F from the upper shaft of the eradicator.

Figure 7:
Fig. 7 shows the shape of the interior portion of the pineapple when removed by the sizing head.

To clearly illustrate the operation of the machine it should be understood that the sizing head J is hollow and tubular in shape. Its forward or upper end, which receives the pineapples, is provided with an annular cutting edge and as the pineapples are forced over the head inner cylindrical shaped sections of pineapple are produced as shown in Fig. 7. The sizing head is carried by a journal member such as indicated at Y, and the cylindrical sections of pineapple cut from the interior portion of each pineapple discharge therethrough and are removed in any suitable manner; the sizing head being continuously rotated by a gear drive such as generally indicated at X, see Fig. 2.

Figure 5:
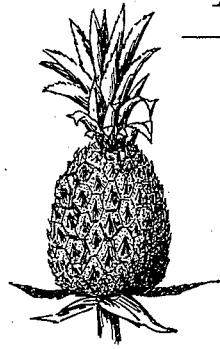
Fig. 5 is a view of the pineapple as it comes from the fields.
Figure 8:
Fig. 8 is a perspective view of the exterior shell removed from the pineapple by the sizing machine.
Figure 9:
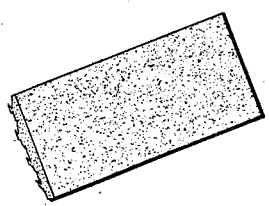
Fig. 9 is another view of the shell showing it flattened out.
Figure 10:
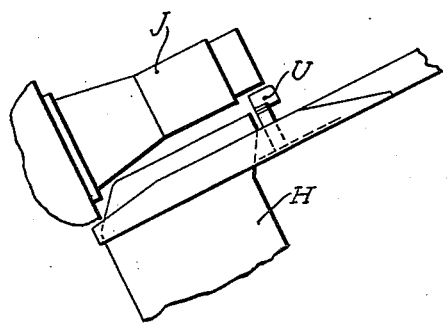
Fig. 10 is a detail side elevation of the sizing head showing the position of the slitting knife U and the feeding chute.

The pineapples to be worked upon have the general shape shown in Fig. 5. The tops and bases are however sliced off before the pineapples are delivered to the sizing machine and when so sliced have the appearance indicated in Fig. 6. When the pineapple is passed through the sizing machine the interior portion thereof is cut out by the sizing machine and the cylindrical section, such as shown in Fig. 7, is produced. A hollow shell section split from end to end is also produced as shown in Fig. 8, and it is this section which is carried by the conveyor C from the sizing machine to the eradicator; the shell section being flattened out as indicated in Fig. 9 during its transfer from the sizing machine to the eradicator. The exterior portion of the shell is full of eyes and of course is covered by an exterior skin or shell, while the inside contains the meat or fruit which is to be removed by the eradicator; this meat or fruit being employed for pineapple juices, crushed pineapple, etc.

Figure 6:
Fig. 6 shows the pineapple with the ends and tops removed.

In actual practice the pineapples with the ends sliced off or removed, as shown in Fig. 6, may be delivered to the sizing head J by hand or otherwise, in most instances an endless conveyor is employed with feeding lugs which delivers the pineapples in successive order one by one. This feeding device forces one pineapple after another over the sizing head where the shells are removed and the interior portion advanced through the hollow cutter and the bearing Y. During this advance movement the shells are slit from end to end by the stationary knife U and when completely slit are thrown off by centrifugal force. The direction of rotation is however clockwise with relation to the conveyor belt C as shown in Fig. 3, and each shell is therefore directed downwardly between the chute H and the conveyor belt, each shell being in this manner directly transferred from the sizing head to the eradicator meat side uppermost without danger of it being soiled or mutilated. The transfer of the shells, meat side uppermost, is automatically taken care of and hand feeding is entirely obviated, the result being that the product obtained is clean and uniform, greater production is secured and considerable saving is made as far as labor is concerned. Each shell will at the same time be fed into the eradicator in exactly the same position, which is another desirable feature, and one which cannot be accomplished by hand feeding.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. The combination with a rotary sizing head of a pineapple sizing machine and a pineapple meat eradicator, of means for automatically transferring pineapple shells from the periphery of the sizing head to the meat eradicator.

2. The combination with a rotary sizing head of a pineapple sizing machine and a pineapple shell meat eradicating machine, of a conveying mechanism interposed between the sizing head and the meat eradicator, and means for automatically transferring the shells from the periphery of the sizing head to the conveying means.

3. The combination with a rotary sizing head of a pineapple sizing machine and a pineapple shell meat eradicating machine, of a conveying mechanism interposed between the sizing head and the meat eradicator, means for automatically transferring the shells from the periphery of the sizing head to the conveying means, and means for adjusting the position of the conveying means with relation to the sizing head to permit pineapple shells of varying thickness and diameter to be transferred.

4. The combination with the sizing head of a pineapple sizing machine and a pineapple shell eradicating machine, of a frame hingedly secured to the meat eradicator, a pair of pulleys journalled in said frame, an endless conveyor carried by said pulleys, means for rotating the pulleys in unison, and means for adjusting the upper end of the frame to and away from the sizing head.

5. The combination with the sizing head of a pineapple sizing machine and a pineapple shell eradicating machine, of a frame hingedly secured to the meat eradicator, a pair of pulleys journalled in said frame, an endless conveyor carried by said pulleys, means for rotating the pulleys in unison, means for adjusting the upper end of the frame to and away from the sizing head, and a guide chute enclosing the conveying side of said belt.

6. The combination with the sizing head of a pineapple sizing machine and a pineapple shell eradicating machine, of a frame hingedly secured to the meat eradicator, a pair of pulleys journalled in said frame, an endless conveyor carried by said pulleys, means for rotating the pulleys in unison, means for adjusting the upper end of the frame to and away from the sizing head, a guide chute enclosing the conveying side of said belt, a conveyor belt in the meat eradicating machine, and means for driving said conveyor and the first named conveyor belt in unison.

7. The combination with the sizing head of a pineapple sizing machine and a pineapple shell meat eradicating machine, of means for automatically transferring the pineapple shells from the sizing head to the meat eradicating machine, meat side uppermost, said transfer means being arranged at right angles to the sizing head.

8. The combination with the sizing head of a pineapple sizing machine, of means for rotating said sizing head, a slitting knife disposed adjacent said head and adapted to split the shells removed from the pineapples by the sizing head longitudinally, a pineapple shell meat eradicating machine disposed below the sizing head, a conveyor disposed between the sizing head and the meat eradicating machine, and means for automatically delivering the shells in successive order from the sizing head to said conveyor, meat side uppermost.

9. The combination with the sizing head of a pineapple sizing machine, of means for rotating said sizing head, a slitting knife disposed adjacent said head and adapted to split the shells removed from the pineapples by the sizing head longitudinally, a pineapple shell meat eradicating machine disposed below the sizing head, a conveyor disposed between the sizing head and the meat eradicating machine, means for automatically delivering the shells in successive order from the sizing head to said conveyor, meat side uppermost, and means for transferring the shells, meat side uppermost, from said conveyor to the meat eradicator.

10. The combination with the sizing head of a pineapple sizing machine, of means for rotating said sizing head, a slitting knife disposed adjacent said head and adapted to split the shells removed from the pineapples by the sizing head longitudinally, a pineapple shell meat eradicating machine disposed below the sizing head, a conveyor disposed between the sizing head and the meat eradicating machine, means for automatically delivering the shells in successive order from the sizing head to said conveyor, meat side uppermost, and a guide chute enclosing the conveyor side of the conveyor to guide the shells from the sizing head to the meat eradicator.

11. The combination with the sizing head of a pineapple sizing machine, of means for rotating said sizing head, a slitting knife disposed adjacent said head and adapted to split the shells removed from the pineapples by the sizing head longitudinally, a pineapple shell meat eradicating machine disposed below the sizing head, a conveyor disposed between the sizing head and the meat eradicating machine, means for automatically delivering the shells in successive order from the sizing head to said conveyor, meat side uppermost, a guide chute enclosing the conveyor side of the conveyor to guide the shells from the sizing head to the meat eradicator, and means permitting adjustment of said conveyor with relation to the sizing head and the guide chute to permit shells of varying thickness to be transferred from the sizing head to the meat eradicating machine.

12. In a system of treating pineapples a sizing machine and an eradicating machine, and means connecting the two machines, said means adapted to receive the shells discharging from the sizing machine at right angles to the latter and transferring the shells meat side up to the eradicating machine.

13. In a system of treating pineapples, a sizing machine and an eradicating machine, a conveyor connecting the machines and driven in unison with the same, and a guide cooperating therewith adapted to direct the shells discharging from the sizing machine at right angles to the latter meat side up to the conveyor and said conveyor delivering the shells in the position specified to the eradicating machine.

HUGH F. OPPERMAN.